(12) United States Patent
Huang

(10) Patent No.: US 7,933,263 B1
(45) Date of Patent: Apr. 26, 2011

(54) ANALYSIS OF VOIP DATA USING INCOMPLETE CALL INFORMATION

(75) Inventor: Zhijie Huang, Campbell, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1152 days.

(21) Appl. No.: 10/788,227

(22) Filed: Feb. 25, 2004

Related U.S. Application Data

(60) Provisional application No. 60/450,260, filed on Feb. 25, 2003.

(51) Int. Cl.
H04L 12/56 (2006.01)
(52) U.S. Cl. .................... 370/356; 370/395.3
(58) Field of Classification Search .............. 370/235, 370/352, 356, 392, 230, 250, 255
See application file for complete search history.

(56) References Cited

U.S. PATENT DOCUMENTS

| | | | | |
|---|---|---|---|---|
| 5,450,525 | A * | 9/1995 | Russell et al. | 704/275 |
| 6,553,515 | B1 * | 4/2003 | Gross et al. | 714/47 |
| 6,917,587 | B1 * | 7/2005 | Sarkar et al. | 370/230 |
| 7,209,473 | B1 * | 4/2007 | Mohaban et al. | 370/352 |
| 2001/0022785 | A1 * | 9/2001 | Pessi | 370/352 |
| 2001/0030958 | A1 * | 10/2001 | Kichise | 370/352 |
| 2002/0015387 | A1 * | 2/2002 | Houh | 370/250 |
| 2004/0071130 | A1 * | 4/2004 | Doerr et al. | 370/352 |
| 2004/0160896 | A1 * | 8/2004 | Luna et al. | 370/235 |
| 2010/0040050 | A1 * | 2/2010 | Johnston | 370/352 |

OTHER PUBLICATIONS

Finisar, *Surveyor 5.0: Network Monitoring and Analysis Software Console*, available on information and belief at least as early as Feb. 2004 (2 pages).
Mier, et al., Network World Fusion, Sizing up VoIP Listening Tools, Dec. 2002, (13 pages).
Sniffer Technologies, Sniffer Voice: Providing Complete Network and Application Management: Data Sheet, 2004 (3 pages).
Acterna, Acterna DA-3400 VoIP Analysis Software: Data Sheet, available on information and belief at least as early as Feb. 2004 (4 pages).

* cited by examiner

*Primary Examiner* — Chirag G Shah
*Assistant Examiner* — Yong Zhou
(74) *Attorney, Agent, or Firm* — Matthew A. Pequignot; Pequignot + Meyers LLC

(57) ABSTRACT

A method for determining the existence of calls in a VoIP system is disclosed. The present method enables calls that escape detection under known methods to be captured and analyzed, thereby improving the operation of a monitoring component that incorporates the principles disclosed herein. In one embodiment, an undetermined user datagram protocol ("UDP") data packet is captured. Analysis of the UDP packet is conducted to determine whether the packet conforms to real-time transfer protocol ("RTP") or real-time transfer control protocol ("RTCP") protocols that are associated with VoIP calls. If the packet corresponds to RTP or RTCP protocols, further analysis is conducted to determine whether the packet corresponds to an already-identified call. If not, a new call record is created to track the packet and all other packets relating to the call. Analysis of various metrics and other properties of the packet can then be conducted as needed.

27 Claims, 4 Drawing Sheets

Call Records

| Protocol | Frame ID | R Factor | Jitter | Dropped Packets |
|---|---|---|---|---|
| SCCP | 12879 | 94 | 0 | 0 |
| SIP | 42224 | 90 | 43 | 0 |
| Unknown | 10883 | 84 | 0 | 0 |
| H323 | 39827 | 88 | 31 | 0 |
| SCCP | 10065 | 60 | 3 | 2 |
| Unknown | 41329 | 72 | 31 | 1 |
| H323 | 11834 | 85 | 0 | 0 |
| H323 | 40293 | 72 | 35 | 1 |

*Fig. 2A*

Channel Records

| Channel | Dst Addr | Dst Port | Src Addr | Src Port | Sync Source | Codec | User R Factor | Jitter (ms) | Dropped Packets |
|---|---|---|---|---|---|---|---|---|---|
| Audio | 192.168.1.150 | 49604 | 192.168.1.159 | 49596 | 3529284421 | G.723 | 57 | 30.125000 | 0 |
| Audio | 192.168.1.159 | 49596 | 192.168.1.150 | 49604 | 1222816103 | G.723 | 76 | 8.750000 | 0 |
| Data | 192.168.1.159 | 1350 | 192.168.1.150 | 1503 | 0 | Data | N/A | 0.000000 | 0 |

*Fig. 2B*

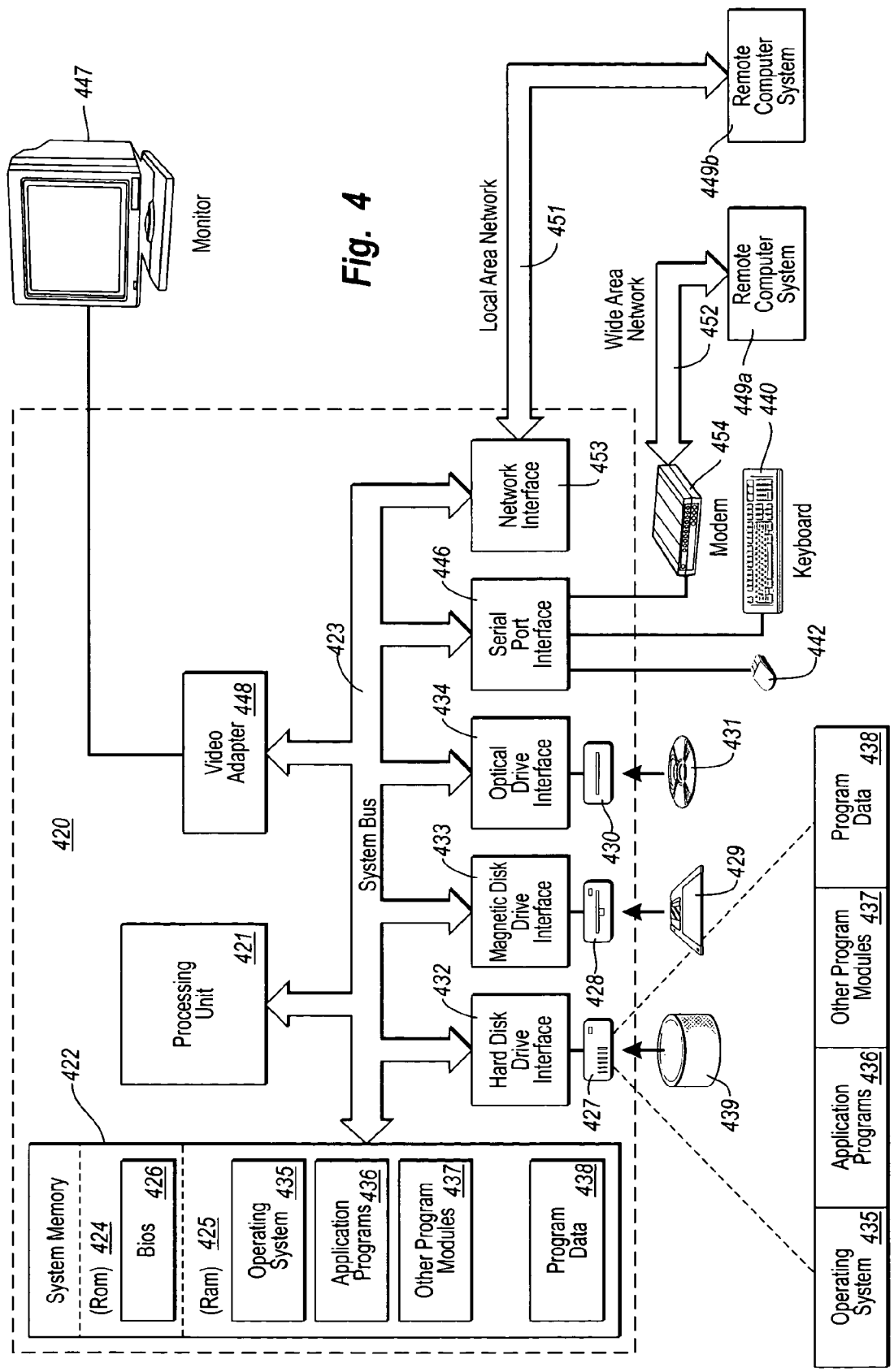

ANALYSIS OF VOIP DATA USING INCOMPLETE CALL INFORMATION

CROSS-REFERENCE TO RELATED APPLICATIONS

This application claims the benefit of U.S. Provisional Application No. 60/450,260, filed Feb. 25, 2003, entitled "Analysis of VoIP Data Using Incomplete Call Information," which is incorporated herein by reference in its entirety.

BACKGROUND OF THE INVENTION

1. The Field of the Invention

The present invention generally relates to voice-over-IP telephony systems. More particularly, the present invention relates to systems and methods for detecting and analyzing voice, video, and data transmissions made via voice-over-IP systems regardless of whether signaling information relating to the transmission is present.

2. The Related Technology

Voice-over-IP ("VoIP") telephony systems are increasingly used to enable real-time transmission of voice and video data via the Internet and associated networks. As VoIP use widens, so does the need to monitor and analyze voice, video, and data transmissions, jointly referred to here as "calls," that are executed by VoIP systems. Indeed, a network administrator may find it useful or necessary to monitor and analyze VoIP calls taking place within the network to ensure that optimum performance is achieved, or alternatively, that problem conditions existing with respect to VoIP transactions are properly diagnosed and corrected.

Various network monitoring and analysis packages are currently available to assist a network administrator in evaluating the health of the network's VoIP system. Many of these packages combine hardware and software components to enable VoIP analysis in a number of ways, including current real-time data capture, capture buffering, and post capture analysis via saved capture files. Regardless of the capture mechanism, these monitoring and analysis packages often operate in a similar manner. VoIP calls typically include a number of voice, video, and/or other data packets, called media packets, that are sandwiched between a set of call signaling packets. The call signaling packets respectively indicate the beginning and ending of a VoIP call. Media and call signaling packets corresponding to a single call can be carried on one or more channels within the network.

A VoIP network monitor analyzes data streams within the network in search of call signaling packets indicating a VoIP call. When found, the monitor captures both the signaling packets and the interposed media packets containing the call data. A call record is then created, comprising a summary of each captured VoIP call including various metrics and basic information associated with the call, such as the call start/stop time, caller/call receiver IP addresses, call status, number of dropped (missing) packets, jitter values, and call quality. The network administrator can then review the metric data and from it determine the existence of any performance issues relating to the VoIP system operating within the network.

The media and corresponding control packets are typically transmitted using two protocols known as real-time transfer protocol ("RTP") and real-time transfer control protocol ("RTCP"). In contrast, the call signaling packets that indicate the commencement or termination of a call can utilize a variety of independent protocols including both public standards such as H.323, SIP, and proprietary protocols such as SCCP.

Despite their utility in diagnosing VoIP system conditions, known network analyzers are sometimes unable to capture a certain number of calls. This can be due to several factors. First, occasionally the call signaling packets are transmitted within the network along a different path, or channel, than the media packets. Second, some vendors employ proprietary call signaling protocols in addition to those mentioned above that are not directly identifiable by the network analyzer. In either case, known network monitoring applications and apparatus are unable to detect a call where a call actually exists. This can result in a significant number of calls being undesirably missed by the network analyzer or related component. This can further result in an incomplete call record that in turn makes it more difficult for a network administrator to properly diagnose the network VoIP system.

In light of the above discussion, then, a need currently exists for a system by which substantially all calls in a VoIP system can be identified and captured for analysis, thereby ensuring maximum performance from VoIP systems.

BRIEF SUMMARY OF EXEMPLARY EMBODIMENTS OF THE INVENTION

Briefly summarized, embodiments of the present invention are directed to a method by which voice, video, and data transmissions ("calls") within a Voice-over-IP ("VoIP") system can be detected, regardless of whether call signaling information relating to the transmission is detected. This in turn enables a more complete call record to be generated when monitoring of the VoIP system occurs, thereby enhancing the ability to diagnose the VoIP system.

In one embodiment, the present method can include various acts, including first detecting a data packet conforming to an underlying user datagram protocol ("UDP"). An analysis is made to decide whether the packet is undetermined, or unrelated to known data streams according to the port designations of the packet.

An undetermined UDP packet, identified above, is then analyzed to determine whether it conforms to RTP/RTCP protocol. If not, control is returned to further packet detection.

If the packet is identified as an RTP or RTCP packet, an analysis is made to determine whether the packet can be associated with a call already being monitored. If the packet can be associated with a previously identified call, it is linked to that call. Analysis of the packet can then be performed to derive various packet properties and metrics relating to the call.

If the packet cannot be associated with another pre-existing call, then a new call record is created that will track the packet and all other forthcoming packets related to the corresponding call. Analysis of the packet can also occur, as before.

The above method is useful in VoIP monitoring situations where call signaling data is undetected. This can occur, for instance, when the call signaling protocol is proprietary and therefore unrecognized, or when the call signaling packets are transmitted along a different channel than the media packets. Advantageously, calls falling into these and other classifications are nonetheless captured using the present method, thereby offering enhanced VoIP call analysis than what was previously available.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2A is a simplified representation of call records generated as a result of practice of one embodiment of the present invention;

FIG. 2B is a representation of channel records generated as a result of practice of one embodiment;

FIG. 4 is a block diagram illustrating another suitable operating environment for the principles of embodiments of the present invention.

DETAILED DESCRIPTION OF EXEMPLARY EMBODIMENTS

Figure 1A:
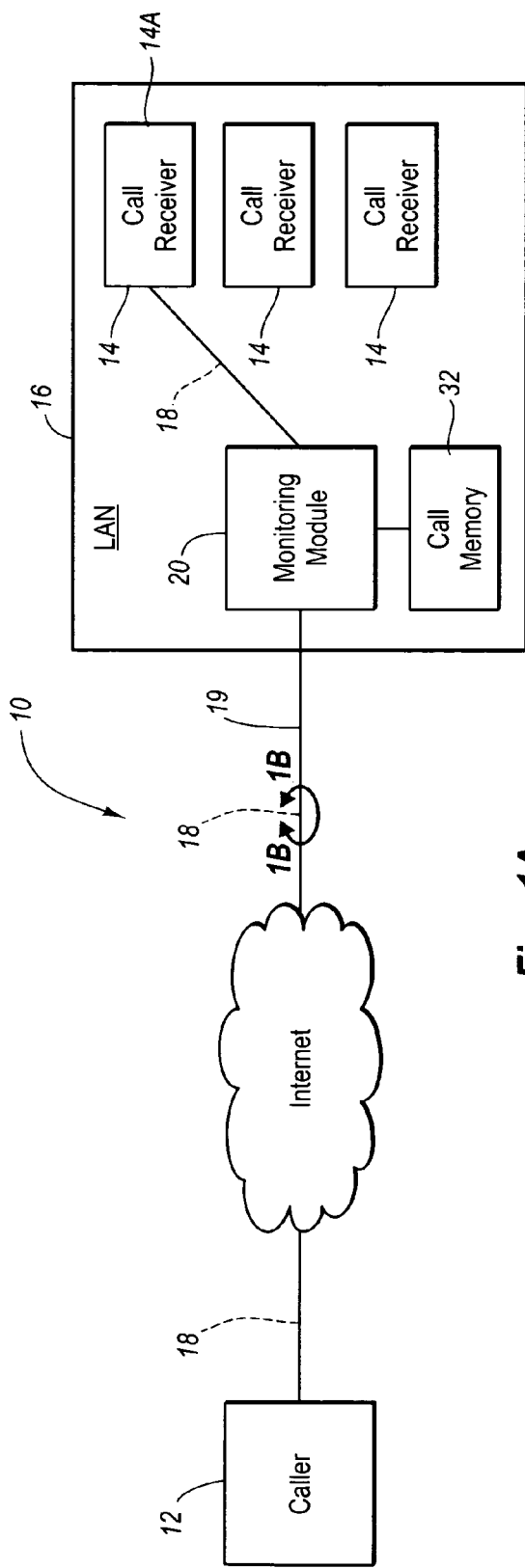
FIG. 1A is a block diagram showing an exemplary operating environment in which practice of the embodiments of the present invention is realized.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1A-4 depict various features of embodiments of the present invention, which is generally directed to systems and methods for capturing Voice-over-Internet-Protocol ("VoIP") call data. The present invention enables such capture even in the event where incomplete or missing call data is encountered. Use of the present invention significantly reduces the amount of calls that fail to be captured by network analysis packages, thereby improving the comprehensive nature of call capture and the corresponding quality of VoIP call analysis that can be performed. In particular, the present invention enables data streams corresponding to calls to not only be detected, but to be associated with other related streams, thereby enabling the identification and unification of one or more data streams into a specified call.

Embodiments of the present invention include or are incorporated in computer-readable media having computer-executable instructions or data structures stored thereon. Examples of computer-readable media include RAM, ROM, EEPROM, CD-ROM, or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network, tunnel, channel, or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data that cause a general purpose computer, special purpose computer, or special purpose processing device to perform a certain function or group of functions. The computer-executable instructions and associated data structures or modules represent an example of program code means for executing the steps of the invention disclosed herein.

As used herein, the term "local area network" ("LAN") should be broadly construed to include any computing environment where tasks are performed by processing devices that are linked together. The LAN can include, for example, the computing environment of any enterprise, business, corporation, individual, or other entity. The LAN can also be understood to include large network structures, such as wide area networks. In the LAN, computer-executable instructions and program modules for performing the features of the invention may be located in local and remote memory storage devices.

The term "monitoring module" is broadly understood herein to include computer software, hardware, or any combination thereof, that performs specified monitoring and/or analysis functions on network data, including VoIP data. Additionally, the term "call" is broadly understood herein to include, among other things, voice, video, and the data transmissions that are executed within or in connection with VoIP systems.

Reference is first made to FIG. 1A, which depicts one operating environment wherein an embodiment of the present invention can be practiced. FIG. 1A shows various components that are involved in an exemplary VoIP call system, generally designated at 10, that enables real time voice and video intercourse between a caller 12 and a call receiver 14. Being an exemplary depiction, the components comprising the VoIP system 10 can vary both in number, type, and particular configuration from what is explicitly shown in FIG. 1A.

In a typical implementation, both the caller 12 and call receiver 14 are located within one or more computing networks. For instance, caller 12 can be disposed in a first network (not shown), while call receiver 14 is disposed within another network, such as a local area network ("LAN") 16. Alternatively, both the caller 12 and call receiver 14 can be located within the same network, or one of the two can be discretely positioned outside of a network. Generally, both the caller 12 and call receiver 14 represent calling nodes in the VoIP system 10, with each node representing a location from which a call can be made or to which a call is placed. A user (not shown) is typically located at each node to participate in the call being transacted.

FIG. 1A also shows that the caller 12 and the call receiver 14 are at least partially connected via the Internet. While this is so in some embodiments, the present invention is not so limited. In the case of both the caller 12 and the call receiver 14 being located with the same network, for instance, connectivity with the Internet is not involved. Thus, it should be appreciated that the present invention can be practiced in a variety of VoIP topologies.

It should be further appreciated that depiction of the caller 12 and the call receiver 14 are merely representative of a large number of calling nodes that can be involved in VoIP call transactions within or between VoIP call systems. Indeed, though only one caller 12 is shown in FIG. 1A, a great number of caller nodes can exist in or be associated with the VoIP system 10. Similarly, any one of a number of call receivers 14 as calling nodes can be involved in a VoIP call. Thus, a VoIP call can occur between any call/call receiver node combination, including calls involving more than one caller and/or call receiver, as in the case of conference calls, where several caller/call receiver nodes participate in the call.

Additionally, it should be noted that the call represented in FIG. 1A between the caller 12 and the call receiver 14A represents only one of a number of calls that can simultaneously occur within the VoIP system 10 at any given time. Also, the calling nodes represented by the caller 12 and the call receivers 14 are preferably bi-directional in that each is able both to receive and transmit data.

FIG. 1A shows a call 18 established between the caller 12 located in a remote location and the call receiver 14A located within the LAN 16. In essence, the call 18 illustrated in FIG. 1A is initiated at the caller 12 and is carried over communication lines 19 that are capable of carrying the call data. As depicted, the call 18 is transmitted over communication lines 19 from the caller 12 to the LAN 16 via the Internet. The call 18 can be received by the LAN 16 and routed as needed. A monitoring module 20 is located in the LAN 16 to perform monitoring and analysis of the call 18, as will be described below. The destination of the call 18 is the call receiver 14A. Establishment of the call 18 between the calling nodes represented by the caller 12 and the call receiver 14 enables data to flow back and forth between the nodes. As will be explained, the data can comprise many forms, including voice, video, or text-based information.

Figure 1B:
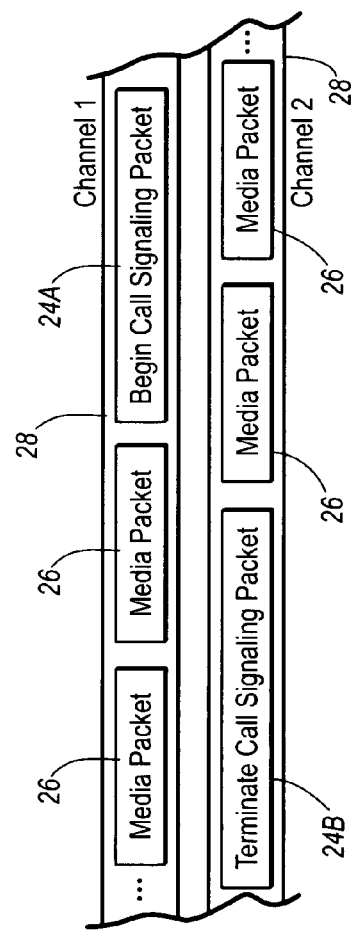
FIG. 1B is a representative view of a portion of FIG. 1A, taken about the lines 1B-1B.

Together with FIG. 1A, reference is now made to FIG. 1B. FIG. 1B illustrates a magnified representation of a portion of the call 18 being transmitted via one of the communication lines 19. The call 18, as previously described, includes a series of discrete packets having a specified length. The packets generally fall into one of two types: call signaling packets 24A and 24B, and media packets 26, each of which is detailed below. The data packets can travel between the nodes of the caller 12 and the call receiver 14 via one or more channels 28 carried by the communication lines 19. In one embodiment, the channels 28 correspond to one of three data types: audio, video, or other data. Thus, the call 18 in one embodiment can be a video teleconference, wherein an audio portion of the call is supplied via one audio channel 28, while the video portion is delivered via one video channel 28.

Call signaling packets 24A and 24B are transmitted at either end of the packet stream that comprises the call 18. For instance, at the initiation of the call 18, one or more "begin" call signaling packets 24A are transmitted between the caller 12 call receiver 14 and, in some embodiments, between a third party device such as a call signaling server or gatekeeper (not shown) as well, to indicate that a call is being commenced therebetween. Hence, the begin call signaling packets 24A can contain, among other information, data indicating both the source and destination of the call data to follow. This initial call information can be used by the LAN 16 and other related components to ensure that the call 18 is properly directed to its intended destination, i.e., the call receiver 14A.

Following the begin call signaling packets 24A is a plurality of media packets 26. Each media packet 26 contains a portion of the information comprising the body of the call 18. For instance, in a voice call, each media packet 26 contains a portion of the voice data produced and transmitted by the caller 12 for receipt by the call receiver 14A. Upon receiving the media packets, the call receiver 14A or other related component can arrange and translate them, according to applicable protocols, before converting them into audible signals that can be understood by a user at the call receiver 14A. Again, each media packet 26 can contain various forms of data, including voice, video, or text-based information. As shown, the media packets 26, like the call signaling packets 24A and 24B, can be transmitted to the call receiver 14A via one, two, or more channels 28 of the communication lines 19.

In the case that more than one channel 28 is being used to carry the various packets, appropriate components can be employed to sort the packets as they are received by the LAN 16 in order to place them in the proper order for receipt by the call receiver 14A.

Following the plurality of media packets 26 is a "terminating" call signaling packet 24B, which indicates to the system 10, and particularly to the call receiver 14A, that the call 18 is terminated. As such, the terminating call signaling packet 24B can contain the necessary data to complete the call 18 and disconnect the caller 12 from the call receiver 14A.

Note here that the present discussion is presented with the call originating at the caller and traveling to the call receiver located in a LAN. However, calls made entirely within the LAN, or from the users within the LAN to users outside of the LAN, for instance, are also capable of being made according to the present invention.

Continuing reference is made to FIGS. 1A and 1B in discussing further details concerning the monitoring module 20. The monitoring module 20 is disposed in relation to the LAN 16 so as to enable it to monitor calls made to, from, or within the LAN. As such the monitoring module 20 can be integrated within the LAN 16, or merely connected to it. In one embodiment, the monitoring module 20 comprises a portable network analyzer that can be removably attached to the LAN 16 via one or more ports (not shown) through which call traffic can be routed. Alternatively, the monitoring module 20 can take other hardware or software forms from that disclosed herein, and can be permanently attached to the LAN 16 or corresponding network. Though shown in FIG. 1A as monitoring traffic entering the LAN 16, the monitoring module 20 can just as easily be arranged so as to monitor only traffic within the LAN, or some other configuration, as can be appreciated by those skilled in the art.

As shown in FIG. 1A, the monitoring module 20 is connected to the LAN 16 in such a way as to receive network traffic from the one or more communication lines 19. The monitoring module 20 monitors and analyzes the various packets that pass through the communication lines 19 into the LAN 16. Among the packets that are monitored by the monitoring module 20 are packets corresponding to a call, such as the call 18 discussed above. Ideally, the monitoring module 20 detects the presence of a call entering the LAN 16 by detecting one of the call signaling packets 24A or 24B. For instance, the call 18 entering the LAN 16 can be detected by the monitoring module 20 when it detects the begin call signaling packet 24A that is sent at the head of the call by the caller 12. When this occurs, the monitoring module 20 begins capturing the various packets associated with the call 18, including the call signaling packets 24A or 24B and all media packets 26.

Upon detecting a call and beginning the capture of packets associated with the call, the monitoring module 20 in one embodiment creates a call record 30. The call record 30 contains various properties and metrics associated with the packets comprising the call 18 as they are captured by the monitoring module 20. These metrics as stored in the call record 30 can be used by a technician after capture to detect any problem conditions that may exist with respect to the VoIP system 10, or simply to analyze VoIP transactional data in real time. The call record 30 can include a variety of call properties such as the type of signaling protocol used, source IP address, destination IP address, call status, start time and stop time, and metrics such as jitter, the number of dropped packets, R factor, and estimated mean opinion score. In addition to these, many other metrics and properties can be tracked and charted in the call record 30. The call record 30 can also be linked to and display all media channels related to the call in the case where multiple channels are employed in transacting the call. This in turn enables further details of properties and quality metrics for one particular media channel to be isolated and examined. Call records 30 can be stored aboard the monitoring module 20, or in a call memory 32 and presented to an observer via a graphical user interface ("GUI") similar to that shown in FIG. 2A.

In addition to the call records 30 shown in FIG. 2A, other records, such as channel records 34, can be displayed via a suitable GUI, such as that shown in FIG. 2B. The channel records 34 can display further information regarding call properties, such as the channel type on which the call is transmitted, destination and source port designations, audio and/or video compressors/decompressors used, etc.

As indicated by the exemplary call records 30 and channel records 34 shown in FIGS. 2A and 2B, multiple calls can be captured and logged by the monitoring module 20 over time. Moreover, several calls can be simultaneously captured and logged by the monitoring module 20 such that substantially all the calls being transacted on the LAN 16 can be captured for later analysis.

In accordance with embodiments of the present invention, the VoIP system 10 shown in FIG. 1A can be extended to capture calls when call signaling data provided by the call signaling packets 24A or 24B are missing or otherwise not detectable or understandable by the monitoring module 20. Instances where call signaling data are not available include situations in which certain unrecognized, proprietary call signaling protocols are employed in connection with the call, or where one or more of the call signaling packets 24A or 24B are transmitted over a different channel or path than the media packets 26. For instance, as mentioned above, the packets employed in a VoIP call are typically transmitted and received using RTP and RTCP protocols.

As mentioned, RTP provides end-to-end network transport functions for applications transmitting real-time data, such as audio, video, and other data. RTP data transport is augmented by RTCP, which is a control protocol used to monitor the data delivery. RTP and RTCP protocols are typically carried atop IP and UDP protocols, though they can be associated with other protocols, such as TCP, for instance. In addition, various signaling protocols, which may be proprietary, are used to initiate and terminate calls. Because the monitoring module may not be configured to recognize these proprietary protocols, it will likely not detect a call signaling packet configured in such a proprietary protocol, and therefore will likely fail to detect the call. This results in a substantial reduction in the quality of results obtained by the monitoring module 20.

To avoid the above problems, embodiments of the present invention relate to a method for detecting calls even in the presence of circumstances that prevent the monitoring module 20 from detecting calls in the typical manner. This method enables VoIP monitoring components to capture and analyze a larger percentage of VoIP calls than would otherwise be possible in light of the circumstances described above.

Figure 3:
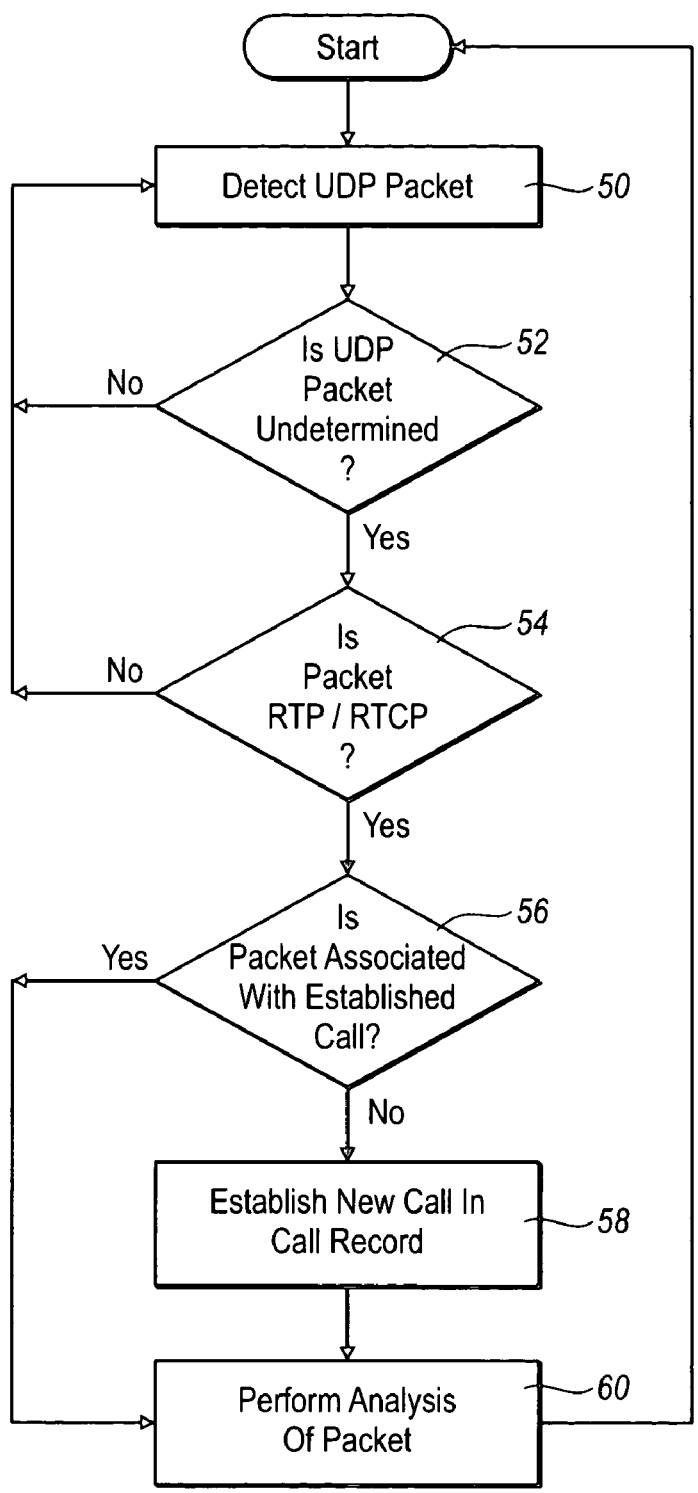
FIG. 3 is a flow diagram showing various acts associated with a method of the present invention, according to one embodiment thereof.

The present method for capturing VoIP calls having incomplete or undetected call signaling information according to one embodiment is presented in FIG. 3. When monitoring and analysis is commenced by a call monitoring component, such as the monitoring module 20 in FIG. 1A, it can be configured in act 50 to successively detect and capture data packets corresponding to UDP ("UDP packets") that are transmitted via a communication line, such as the communication line 19 in FIG. 1A. In other embodiments, packets other than UDP packets can be selectively captured for analysis, if desired.

A UDP packet detected in act 50 can then be examined in act 52 to determine whether it is an undetermined UDP packet, i.e., the UDP packet is not readily identified with respect to a specified application or destination, such as an identified destination or source port designation. If it is determined that the UDP packet is not undetermined, the packet is ignored and control is returned to act 50, where a successive UDP packet can be detected. If the UDP packet is undetermined, however, act 54 can be executed, wherein it is determined whether the UDP packet is configured according to either the RTP or RTCP protocols. This determination is made according to an algorithmic process explained further below.

If it is determined in act 54 that the UDP packet is not configured according to RTP or RTCP, the packet is ignored and the control returns to act 50 for detection and analysis of the next packet. If it is determined to be a packet corresponding to RTP/RTCP, however, the packet is likely a media packet corresponding to a portion of a VoIP call. In this way, embodiments of the present invention can detect protocols associated with media packets of a VoIP call, in addition to signaling protocols associated with call signaling packets. This expands the call detection ability of the present system over other known systems in call situations where the call signaling packets may be unobservable due to various circumstances, as described earlier. Note that the present system can be configured to detect packets having one of a variety of other protocols, in addition to RTP/RTCP protocols.

In act 56, it is determined whether the RTP/RTCP packet can be linked to another call that has already been detected and identified by the monitoring component. If the packet can be associated with an already-identified call, then a call record that is maintained by the monitoring component, such as the call record 30 of FIG. 2A, can be updated with the appropriate information to indicate the association. This information can include, among other things, identification of the channel on which the packet was detected. Control can then be passed to act 60, where analysis of the packet is performed to extract and record specified call metrics according to the configuration of the VoIP system. Such metrics and properties can then be input to the call record 30.

If the packet cannot be associated with an already-identified call, a new call entry is created in the call record 30 of the monitoring component in act 58. In one embodiment, only RTP packets are used to create new call records, as detected RTCP packets can correspond to more than one channel in some circumstances. Act 60 is then performed on the packet, wherein, as above, various packet properties and metrics are analyzed and recorded in the call record as configured by the VoIP system. This information can include, among other things, identification of the channel on which the packet was detected. Source IP address, destination IP address, and other metrics of the call can also be detected and recorded as needed in this act. If desired, calls represented by packets detected and identified according to the above method can be labeled as having an unknown call signaling protocol.

Control is returned to the start position of the flow diagram shown in FIG. 3 after act 60 is complete so that succeeding packets can be analyzed and organized into calls and channels as described above. The analysis of succeeding packets can be performed immediately or can be deferred until after intervening acts (not shown) are performed by the VoIP system 10. In this way, substantially all calls can be captured and analyzed, notwithstanding their use of proprietary or unrecognized call signaling packets. In other words, the present systems and methods for detecting VoIP calls do not rely on call signaling packet identification alone in capturing calls over a network, thereby providing more complete and reliable VoIP call capture and analysis.

Notwithstanding the above discussion, the present method can be altered in other embodiments so as to suit the needs of a particular application. For instance, in one embodiment all packets that pass through the monitoring module can be captured in act 50 and then immediately examined in act 54 to determine whether they are RTP/RTCP, thereby eliminating act 52. In addition to this, other modifications to the method can be realized, as appreciated by one skilled in the art. Note also that the method as described above can be practiced in connection with other transport and signaling protocols than those explicitly described herein, including combinations of mentioned and non-mentioned protocols.

The acts described above in connection with the method depicted in FIG. 3 are performed in one embodiment via computer algorithms and/or executable instructions that provide the needed functionality to the monitoring component. In one embodiment, the code that implements act 54 (determining whether a packet is RTP/RTCP) is primarily based on algorithms found in appendix sections A.1 and A.2 of the Request for Comments ("RFC") 3550, entitled "RTP: A Transport Protocol for Real-Time Applications," which is incorporated herein by reference in its entirety.

In detail, the analysis of a packet, as in act 54, to determine whether it includes RTP or RTCP protocols can include various algorithmic or executable instructed actions. These actions involve inspection of the packet header or its contents as detailed in RFC 3550. Further, these actions can be delineated into actions involving the determination of the packet as an RTP packet, and the determination of the packet as an RTCP packet.

For RTP packet determination, various actions with respect to the packet header fields can be taken. For instance, the packet version field can be checked to see if it matches the current RTP version of two. The padding bit field can be checked for similarity to RTP padding configurations. The payload type field of the packet can be checked to ensure it contains one common to RTP packets, not those typical of RTCP or other protocols. For example, the payload type for an RTP packet would not correspond to the values 72 or 73, as these are typical of RTCP packets. If the payload type is recognized, the extension bit can be checked to ensure it corresponds and agrees with the packet payload type. Additionally, the length of the packet can be checked to ensure it agrees with the known payload type in cases where the payload type corresponds to specified combinations of fixed length payloads or frames, as defined by Request for Comments 3551, entitled, "RIP Profile for Audio and Video Conferences with Minimal Control," which is incorporated herein by reference in its entirety.

In addition to analysis of the packet header, other packet analysis actions can be taken. For example, the destination port of the packet can be examined: an even-numbered port suggests the packet is an RTP packet. Further, a specific port, such as 5004, can be reserved for RTP packets exclusively. Thus, if the destination port of the packet matches the reserved number, the packet can be designated as an RTP packet.

A similar analysis can be conducted to determine whether a packet conforms to the RTCP protocol. For RTCP packet determination, various actions with respect to the packet header fields can be taken. For instance, the packet version field can be checked to see if it matches the current RTCP version of two. The payload type field of the packet can be checked to ensure it contains one common to RTCP packets, not those typical of RTP or other protocols. For example, the payload type for a first RTCP packet in a compound RTCP packet group would indicate an "SR" or "RR" value, typical of such RTCP packets. Similarly, the padding bit field should have a value of zero for the first packet of a compound RTCP packet group. Additionally, the lengths of the packets in a compound RTCP packet group can be checked to ensure that together they equal the overall length of the compound RTCP packet group.

In addition to analysis of the packet header, other packet analysis actions can be taken. For example, the destination port of the packet can be examined: an odd-numbered port suggests the packet is an RTCP packet. Further, a specific port, such as 5005, can be reserved for RTCP packets exclusively. Thus, if the destination port of the packet matches the reserved number, the packet can be designated as an RTCP packet.

In addition to the above actions, other actions that are suggestive of the packet protocol can also be employed. As such, it should be appreciated that the above actions are not exhaustive of the actions that can be used in connection with act 54 as shown in FIG. 3. Note further that, in addition to the above algorithmic implementation, other means can also be devised to provide this same functionality. Examples of these means include firmware and hardware-based solutions.

Several algorithmic and/or executable instructed actions can also be used in carrying out act 56 in attempting to associate an RTP or RTCP packet with an established call. For instance, an identified RTCP packet having a specified destination or source port number that is one more than an identified RTP packet stream already listed in the call record can be determined to be associated with the call represented by the RTP packet stream. Also, streams of RTP packets between two specified IP addresses can be determined to correspond to a specified call. These and other actions not explicitly specified herein can thus be used to associate RTP and RTCP packets with known calls.

Because the present method for detecting VoIP calls does not rely on the detection of call signaling packets, which in any case may be unobservable, the identification of call termination often cannot be accomplished directly. In response, embodiments of the present invention enable indirect identification of call termination to occur. Specifically, a timeout procedure can be implemented with the present system in that call streams that are detected by the monitoring component as being inactive for a specified period of time are deemed to be terminated, and are noted as such in the call record. Other means for accomplishing phone call termination are also contemplated.

In some instances, RTP/RTCP packets can be sent by the caller 12 (see FIG. 1A) after a call has been terminated by the receipt of termination call signaling packets. If this occurs, various steps, including timeout procedures and the delayed erasure of the call record, such as the call record 30 (FIG. 2A), can be taken by the present system to finally terminate the call, thereby preventing a new call record being created for the late-arriving packets.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431, such as, for example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through serial port interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 449*b* via link 451. Link 451 represents a portion of a network, and remote computer system 449*b* represents a node of the network.

Likewise, computer system 420 includes serial port interface 446, through which computer system 420 receives data from external sources and/or transmits data to external sources. Serial port interface 446 is coupled to modem 454, through which computer system 420 receives data from and/or transmits data to external sources. Alternatively, modem 454 can be a Data Over Cable Service Interface Specification ("DOCSIS") modem or digital subscriber lines ("DSL") modem that is connected to computer system 420 through an appropriate interface. However, as depicted in FIG. 4, serial port interface 446 and modem 454 facilitate the exchange of data with remote computer system 449*a* via link 452. Link 452 represents a portion of a network, and remote computer system 449*a* represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, other program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 449*a* and/or remote computer system 449*b*. Execution of such modules may be performed in a distributed environment as previously described.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In a computer system including system memory, a method of detecting data packets relating to a call in a voice-over-IP system, the method comprising:
  detecting a data packet of a voice-over-IP call, wherein call signaling data are missing or not detectable or understandable;
  determining whether the data packet corresponds to RTP or RTCP protocols including checking a packet version field, a padding bit field, a payload type field, an extension bit; or a length of the packet to determine whether the data packet corresponds to RTP or RTCP protocols;
  if the data packet corresponds to RTP or RTCP protocols, determining whether the RTP or RTCP data packet can be associated with a previously identified call; and
  if the RTP or RTCP data packet cannot be associated with a previously identified call, creating a call record pertaining to the RTP or RTCP data packet in a call memory.

2. A method of detecting data packets as defined in claim 1, wherein detecting a data packet further comprises:
  detecting a data packet corresponding to the UDP protocol.

3. A method of detecting data packets as defined in claim 2, further comprising:
  determining whether the data packet corresponding to the UDP protocol is unidentified with respect to a port of the computer system.

4. A method of detecting data packets as defined in claim 3, further comprising:
  if the data packet corresponding to the UDP protocol is, resuming detection of succeeding data packets.

5. A method of detecting data packets as defined in claim 1, further comprising:
  analyzing at least one metric of the RTP or RTCP data packet relating to the call record.

6. A method of detecting data packets as defined in claim 1, further comprising:
  if the data packet does not correspond to RTP or RTCP protocols, resuming detection of succeeding data packets.

7. A method of detecting data packets as defined in claim 1, wherein detecting a data packet is performed by a hardware-based monitoring component.

8. A method of detecting data packets as defined in claim 1, wherein the voice-over-IP system is at least partially implemented in connection with the Internet.

9. A non-transitory computer program product for use in a computer system including system memory, the computer program product for implementing a method of detecting data packets relating to a call in a voice-over-IP system, the computer program product comprising one or more computer-readable media having stored thereon computer executable instructions that, when executed by a processor, cause the computer system to perform the following:
  detect a data packet of a voice-over-IP call, wherein call signaling data are missing or not detectable or understandable;
  determine whether the data packet corresponds to RTP or RTCP protocols;
  if the data packet corresponds to RTP or RTCP protocols, determine whether the RTP or RTCP data packet can be associated with a previously identified call, wherein determining whether the RTP or RTCP data packet can be associated with a previously identified call includes checking an identified RTCP packet having a specified destination or source port number that is one more than an identified RTP packet stream already listed in the call record is determined to be associated with the call represented by the RTP packet stream; and
  if the RTP or RTCP data packet cannot be associated with a previously identified call, create a call record pertaining to the RTP or RTCP data packet in a call memory.

10. A non-transitory computer program product as defined in claim 9, wherein the computer executable instructions, when executed, cause the computer system to:
  detect a data packet corresponding to the UDP protocol.

11. A non-transitory computer program product as defined in claim 10, wherein the computer executable instructions, when executed, cause the computer system to:
  determine whether the data packet corresponding to the UDP protocol is unidentified with respect to a port of the computer system.

12. A non-transitory computer program product as defined in claim 11, wherein the computer executable instructions, when executed, cause the computer system to:
  if the data packet corresponding to the UDP protocol is identified, resume detection of succeeding data packets.

13. A non-transitory computer program product as defined in claim 9, wherein the computer executable instructions, when executed, cause the computer system to:
  analyze at least one metric of the RTP or RTCP data packet relating to the call record.

14. A non-transitory computer program product as defined in claim 9, wherein the computer executable instructions, when executed, cause the computer system to:
  if the data packet does not correspond to RTP or RTCP protocols, resume detection of succeeding data packets.

15. A non-transitory computer program product as defined in claim 9, wherein the computer executable instructions that, when executed, cause the computer system to detect a data packet are performed by a hardware-based monitoring component.

16. A non-transitory computer program product as defined in claim 9, wherein the computer executable instructions, when executed, cause the computer system to:
  determine the termination of a call corresponding to the data packet by utilizing a timeout procedure.

17. In a computer system including system memory, a method of detecting data packets relating to a call in a voice-over-IP system, the method comprising:
  detecting a data packet corresponding to UDP protocol, wherein the data packet is part of a stream of data packets that represents only part of a communication in the voice-over-IP system, wherein call signaling data are missing or not detectable or understandable;
  determining whether the UDP data packet corresponds to RTP or RTCP protocols;
  if the data packet corresponds to RTP or RTCP protocols, determining whether the RTP or RTCP data packet can be associated with a previously identified call;
  if the RTP or RTCP data packet cannot be associated with a previously identified call, creating a call record pertaining to the RTP or RTCP data packet in a call memory; and
  determining that when the stream of data packets has been inactive for a specified amount of time that the stream of data packets have been terminated from a source providing the stream of data packets and recording the termination in the cal record.

18. A method of detecting data packets as defined in claim 17, wherein determining whether the data packet corresponds to RTP or RTCP protocols further comprises:
  examining a header of the data packet to determine if the data packet corresponds to RTP or RTCP protocols.

19. A method of detecting data packets as defined in claim 18, wherein at least one portion of the header is examined, the at least one portion being selected from the group consisting of version, padding, payload type, extension bit, data length, and destination port designation.

20. A method of detecting data packets as defined in claim 18, wherein examining a header of the data packet further comprises:
  determining whether a payload type portion of the header conforms to payload types typically associated with RTP and RTCP packets.

21. A method of detecting data packets as defined in claim 17, wherein determining whether the RTP or RTCP data packet can be associated further comprises:
  examining a destination or source port designation of the RTP or RTCP data packet.

22. A method of detecting data packets as defined in claim 21, wherein examining a destination or source port designation further comprises:
  determining whether at least one of the destination and source port designations of the RTP or RTCP data packet has a value within one of at least one of a destination and source port of a previously identified call.

23. A method of detecting data packets as defined in claim 17, wherein determining whether the RTP or RTCP data packet can be associated further comprises:
  examining source and destination IP addresses of the RTP or RTCP data packet.

24. A method of detecting data packets as defined in claim 17, wherein determining whether the RTP or RTCP data packet can be associated further comprises:
  associating a channel on which the RTP or RTCP data packet is transmitted with a previously identified call.

25. A method of detecting data packets as defined in claim 17, further comprising:
  if the data packet is associated with a previously terminated call, using a timeout procedure to prevent creation of a new call record.

26. A method of detecting data packets as defined in claim 17, wherein the data packet is associated with a call signaling protocol that is selected from the group consisting of SIP, SCCP, and H 323, and wherein the call is composed of data packets that are transmitted on a plurality of channels.

27. A method of performing analysis of a call as defined in claim 17, wherein the data packet is associated with a call signaling protocol that is not identifiable by a monitoring component.

* * * * *